Nov. 8, 1932.                C. DUNOIS                1,887,293
                     VALVE CAP FOR PNEUMATIC TIRES
                          Filed April 5, 1929
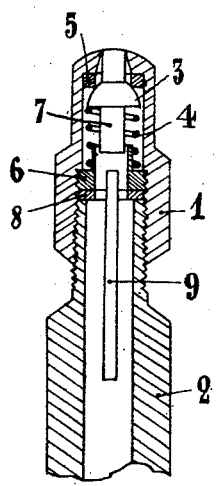
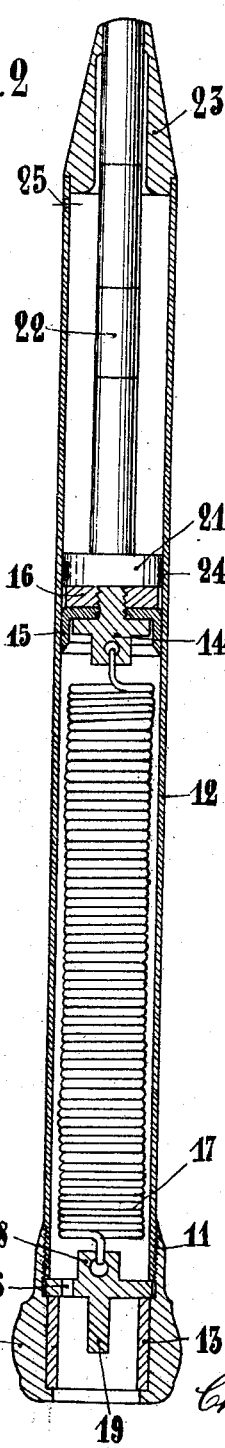
INVENTOR
Charles Dunois
BY
Andrew T. Dupont
his ATTORNEY Patented Nov. 8, 1932

1,887,293

UNITED STATES PATENT OFFICE

CHARLES DUNOIS, OF CHAMPIGNY, FRANCE

VALVE CAP FOR PNEUMATIC TIRES

Application filed April 5, 1929, Serial No. 352,720, and in France July 25, 1928.

Such devices as are available now for the gauging of the pressure in the inner tube of automobile wheel tires involve each time the preliminary unscrewing of the valve cap, then the re-fitting of the same into position.

The subject matter of this invention is a device whereby any accessory manipulation is avoided and the air gauge may directly be connected to the air space of the inner tube under pressure.

For that purpose, the device comprises two separate members, viz.:

1.—A special valve cap;
2.—An air gauge.

These members are shown by way of example in the appended drawing wherein:—

Figure 1 is a cross section lengthwise of the valve cap.

Figure 2 is a cross section lengthwise of the air gauge.

Provided within the body 1 of the cap (Fig. 1) which is screwed upon the valve body 2 is a valve 3 which is pressed against the seat 5 thereof by means of a load spring 4. The seat is made of rubber or any suitable plastic material so as to ensure a perfectly air-tight joint being obtained, should the tube valve happen to leak. A supporting sleeve 6 acts as an abutment for spring 4 and a guide for the shank 7 of valve 3; and in addition, it holds in position the various members housed within the cap. A washer 8 preferably made of leather provides an air-tight joint between the tip of the tube valve body and the cap. Furthermore, 9 indicates the shank of the inner tube valve, which valve is depressed by the shank 7 of valve 3 when the latter happens to be moved from its seat.

The air gauge shown in Fig. 2 may be shaped externally like a fountain pen comprising a knurled head 10 screwed at 11 upon the body 12 of the device and which is provided internally with a packing bush 13 made, for instance, of rubber.

Housed within the barrel-like body of the air-gauge is a piston 14 the air-tightness of which is secured by means of a cup leather 15 held in position by means of a nut 16. The said piston is attached to a suitably calibrated spring 17 which is connected at the other end thereof to a disk 18 which forms the bottom of the barrel 12 and is provided with a shank 19 located centrally in the recess formed by the knurled head 10. A port 26 is provided to allow the air to flow in.

An additional piston 21 which is completely independent from piston 14 is housed within the air-gauge; the shank of said piston, which is suitably graduated, is adapted to be thrust out of the air-gauge and is guided by means of the tip 23 which may be given a fountain pen-like form. A braking ring 24 arranged in the periphery of piston 21 allows the same to slide with an amount of friction sufficient to maintain the piston in the successive positions which it may be caused to assume by the thrust of piston 14. Finally, an air let-off hole 25 is drilled through the end of barrel 12 in order to avoid any compression of the air in the space between tip 23 and piston 21.

The device operates as follows:—

The valve cap being screwed home once for all on the inner tube valve body, when it is desired to test the pressure, one has only to fit the air-gauge head 10 right over the cylindrical portion of the valve cap. The packing bush 13 provides the necessary air-tight joint and the shank 19 engages the head of valve 3; the latter is raised from its seat and comes into engagement with shank 9 of the inner tube valve; said valve opens, thus letting off the air which is admitted into the air-gauge through port 26.

The piston 14 is thus driven away against the action of spring 17 by an amount which is proportional to the value of the pressure in the inner tube.

The second piston 21 is driven away by piston 14 and the shank 22 thereof is thrust out through tip 23, thus displaying the graduation thereof for indicating the value of the pressure. As piston 21 is wholly independent of piston 14 it is not necessary for the air-gauge to be left in position on the valve cap for such reading of the pressure. When the air-gauge is removed the cap closes automatically under the action of spring 4 of valve 3, thus closing the device. The piston 14 of the air-gauge is returned by spring 17 to its inoperative position while the piston 21 is held by the braking ring 24 in the position it was brought into by piston 14. After the reading is taken, a pressure of the finger upon the extremity of the graduated rod 22 brings in turn piston 21 into its inoperative position.

I claim:

In combination with an inflating valve body having a valve stem therein, a closure for said inflating valve body, comprising a hollow cap having a smooth periphery, and adapted to be threaded upon the valve body, an inner shoulder within said hollow cap, near the upper end thereof, a packing ring resting against said shoulder, a reciprocable valve member having integral stem portions protruding from opposite sides thereof, one of said stem portions extending through the said packing ring to a point wholly within the upper confines of the hollow cap, a spring abutting the valve member and surrounding the other of said stem portions, said spring urging the valve member against the said packing ring, a centering member within said hollow cap having an integral disc portion serving as a lower abutment for the spring and having a hollow cylindrical extension within which one of the above mentioned stem portions and the stem of the inflating valve are adapted to be guided, to depress the valve stem in the inflating valve body, and a second packing ring within said hollow cap adjacent said collar and adapted to abut the end of the inflating valve body.

In testimony whereof I affix my signature.

CHARLES DUNOIS.